(12) United States Patent
Peng et al.

(10) Patent No.: US 9,600,864 B2
(45) Date of Patent: Mar. 21, 2017

(54) SKIN TONE TUNED IMAGE ENHANCEMENT

(71) Applicant: Intel Corporation, Santa Clara, CA (US)

(72) Inventors: Ya-Ti Peng, Sunnyvale, CA (US); Yi-Jen Chiu, San Jose, CA (US); Hong Jiang, El Dorado Hills, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/774,639

(22) PCT Filed: Mar. 26, 2014

(86) PCT No.: PCT/US2014/031869
§ 371 (c)(1),
(2) Date: Sep. 10, 2015

(87) PCT Pub. No.: WO2014/189613
PCT Pub. Date: Nov. 27, 2014

(65) Prior Publication Data
US 2016/0048949 A1       Feb. 18, 2016

Related U.S. Application Data

(60) Provisional application No. 61/827,036, filed on May 24, 2013.

(51) Int. Cl.
*G06K 9/00*     (2006.01)
*G06T 5/00*     (2006.01)
(Continued)

(52) U.S. Cl.
CPC .............. *G06T 5/001* (2013.01); *G06T 5/20* (2013.01); *G06T 7/408* (2013.01); *H04N 1/628* (2013.01); *G06T 2207/10024* (2013.01)

(58) Field of Classification Search
CPC   G06T 5/001; G06T 5/20; G06T 7/408; G06T 2207/10024; H04N 1/628
(Continued)

(56) References Cited

U.S. PATENT DOCUMENTS 8,238,654 B2 *  8/2012  Pan ...................... G09G 5/02
                                                   345/593
8,385,638 B2 *  2/2013  Reid .................. G06K 9/00234
                                                   382/162

(Continued)

FOREIGN PATENT DOCUMENTS

JP      2004005660 A     1/2004

OTHER PUBLICATIONS

International Search Report and Written Opinion mailed Jul. 10, 2014 for PCT Application No. PCT/US2014/031869.
(Continued)

*Primary Examiner* — Mekonen Bekele
(74) *Attorney, Agent, or Firm* — Green, Howard & Mughal, LLP

(57) ABSTRACT

Techniques related to skin tone tuned image enhancement are described. Such techniques may include performing an enhancement of a pixel of an input image based on a skin tone detection score and local detail information of the pixel.

24 Claims, 9 Drawing Sheets

(51) Int. Cl.
*H04N 1/62* (2006.01)
*G06T 5/20* (2006.01)
*G06T 7/40* (2017.01)

(58) Field of Classification Search
USPC .................. 382/162, 167, 264; 345/590, 594
See application file for complete search history.

(56) References Cited

U.S. PATENT DOCUMENTS

| | | | |
|---|---|---|---|
| 2003/0223622 A1 | 12/2003 | Simon et al. | |
| 2006/0066912 A1* | 3/2006 | Kagaya .................. | H04N 1/628 358/302 |
| 2007/0172119 A1 | 7/2007 | Pan et al. | |
| 2008/0056566 A1 | 3/2008 | Shehata | |
| 2009/0201310 A1* | 8/2009 | Weiss .................... | G06T 11/001 345/594 |
| 2010/0172578 A1* | 7/2010 | Reid .................. | G06K 9/00234 382/165 |
| 2010/0194773 A1* | 8/2010 | Pan ......................... | G09G 5/02 345/590 |
| 2010/0246950 A1* | 9/2010 | De Kruif ............ | H04N 1/6005 382/167 |
| 2011/0181746 A1 | 7/2011 | Free | |
| 2011/0249756 A1* | 10/2011 | Doepke .............. | G06K 9/00234 375/240.24 |
| 2012/0070079 A1* | 3/2012 | Yi .......................... | H04N 1/628 382/167 |
| 2012/0176395 A1 | 7/2012 | Peng et al. | |
| 2013/0129209 A1* | 5/2013 | Reid .................. | G06K 9/00234 382/165 |
| 2013/0279802 A1* | 10/2013 | van der Merwe . | G06K 9/00362 382/165 |
| 2015/0110352 A1* | 4/2015 | Csefalvay .......... | G06K 9/00228 382/103 |
| 2016/0086316 A1* | 3/2016 | Lee ........................ | G06T 7/408 382/167 |

OTHER PUBLICATIONS

International Preliminary Report on Patentability mailed Dec. 3, 2015 for PCT Application No. PCT/US2014/031869.
Extended European Search Report, mailed Oct. 28, 2016, for European Patent Application No. 14800692.7.

* cited by examiner

SKIN TONE TUNED IMAGE ENHANCEMENT

RELATED APPLICATIONS

The present application is a National Stage Entry of International Application PCT/US2014/031869, filed 26 Mar. 2014, which claims priority to U.S. Provisional Application No. 61/827,036 filed May 24, 2013, and titled "IMAGE DETAIL ENHANCEMENT CONSIDERING SKIN TONE REGIONS", the contents of which are hereby incorporated in their entirety.

BACKGROUND

Image and video detail enhancement is an important feature in media applications to improve user experiences in content viewing and content generation. For example, more vivid results may be obtained with detail enhancement techniques applied to raw image content. Furthermore, human vision and perception may be sensitive to skin tones and the presentment of regions of skin. In some instances, such enhancements may provide undesirable sharpening of texture on certain types of objects (e.g., human faces or other skin regions), which may degrade a user's perception of the image or video.

As such, existing techniques do not provide for vivid image enhancement and pleasing presentment of skin tones.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
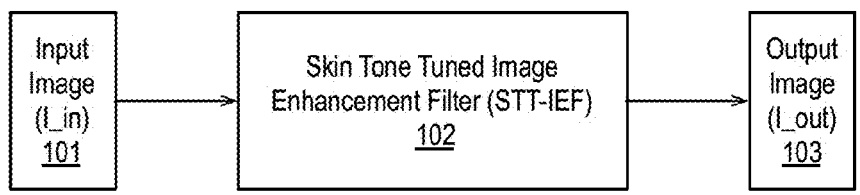
FIG. 1 is an illustrative diagram of an example system for providing image enhancement.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to skin tone tuned image enhancement.

In some instances of image enhancement, the enhancements may provide undesirable sharpening of texture on human faces or other skin regions or the like, which may degrade a user's perception of the image or video. For example, human vision may be sensitive to skin regions and may prefer smooth visual effect over such regions. Embodiments discussed herein may provide a skin tone tuned image enhancement filter (STT-IEF) which may include a skin tone detection (STD) module, a detail extractor module, and a skin tone aware detail enhancement module. The skin tone tuned image enhancement filter may take skin color probability into account and intelligently adjust the level of emphasis on details in skin areas or regions of an image. Using such techniques, sharper (e.g., more vivid) effects may be provided on general image content and smoothness may be provided in skin regions simultaneously. The resultant image (e.g., the enhanced output image) may thereby provide improved overall visual quality compared to traditional image enhancement techniques.

As will be described in greater detail below, a skin tone detection module may determine a skin tone detection score for a pixel of an input image. A detail extractor module may determine a local detail information for the pixel of the input image. In an embodiment, a skin tone detection score and a local detail information is determined for each pixel of the input image. The local detail information and the skin tone detection score may be provided to a skin tone aware detail enhancement module, which may perform a skin tone based enhancement of the pixel based on the local detail information and the skin tone detection score to generate an output pixel. In an embodiment, a skin tone based enhancement may be performed for each pixel of the input image to generate each pixel of an output image.

The skin tone based enhancement may include modifying the input pixel by an extracted detail modified by a skin tone based enhancement factor (e.g., adding the input pixel with a product of the extracted detail and the skin tone based enhancement factor). For example, if it is likely the pixel is a skin tone pixel (e.g., the pixel has a high skin tone detection score), the skin tone based enhancement factor may be relatively small (and if the score is one, the factor may be zero) such that the extracted detail is reduced and a more smooth result is provided (e.g., little enhancement is performed and the smoothness of the input image is maintained in the skin region). However, if it is likely the pixel is not a skin tone pixel (e.g., the pixel has a zero or low skin tone detection score), the skin tone based enhancement factor may be relatively large such that the extracted detail is maintained and a sharper result is provided. For example, if the skin tone detection score is zero, the skin tone based enhancement factor may be one and multiplying the extracted detail by it will have no effect and a traditional image enhancement may result. Such details are discussed further and, in particular, with respect to Equation (1).

FIG. 1 is an illustrative diagram of an example system 100 for providing image enhancement, arranged in accordance with at least some implementations of the present disclosure. As shown, system 100 may include a skin tone tuned image enhancement filter (STT-IEF) 102. In some examples, skin tone tuned image enhancement filter 102 may be implemented as an image enhancement module. In some examples, skin tone tuned image enhancement filter 102 may be implemented as a video enhancement module. Skin tone tuned image enhancement filter 102 may receive an input image (I_in) 101 and may provide an output image (I_out) 103. Input image 101 may include any suitable input image provided in any suitable color space or image file format. For example, input image 101 may include a decoded image, a captured image (e.g., via a camera or the like), a rendered image, or an image from a sequence of video images or frames, or the like. In an example, input image 101 may be retrieved from a memory of a computing device. As discussed further herein, input image 101 may be processed in the YUV (luma Y and chrominance U, V) color space. In some examples, input image 101 may be preprocessed to convert it to the YUV color space from another color space such as the RGB (red-green-blue) color space, the $YP_BP_R$ (luma, blue difference chroma $Y_B$, and red difference chroma $P_R$) color space, or the $YC_BC_R$, (luma Y, blue difference chroma $C_B$, and red difference chroma $C_R$) color space, or the like.

As is discussed further herein, skin tone tuned image enhancement filter 102 may determine a skin tone detection score (e.g., a likelihood of being skin toned) and a local detail information for an input pixel of input image 101. For example, the local detail information may provide a parameter associated with an amount of detail for the input pixel. In some examples, the local detail information may represent a gray level value. In some examples, the local detail information may represent a Y (e.g., luma) value. In some examples, the skin tone detection score may be based on a center of skin color, which may be user defined, received from a driver, or set to a default, or the like. For example, the center of skin color may be varied for different input images. Skin tone tuned image enhancement filter 102 may apply a skin tone based enhancement to the input pixel based on the skin tone detection score and the local detail information to generate an output pixel of output image 103. In an embodiment, such techniques may be applied to each pixel of input image 101 to generate output image 103. In an embodiment, such techniques may be applied to a portion or portion, a region or regions, or subset of the pixels of input image 101 to generate output image 103. Output image 103 may stored to memory and output image may be configured for further processing (e.g., further image enhancement or encoding or the like) and/or for presentment via a display device.

Figure 2:
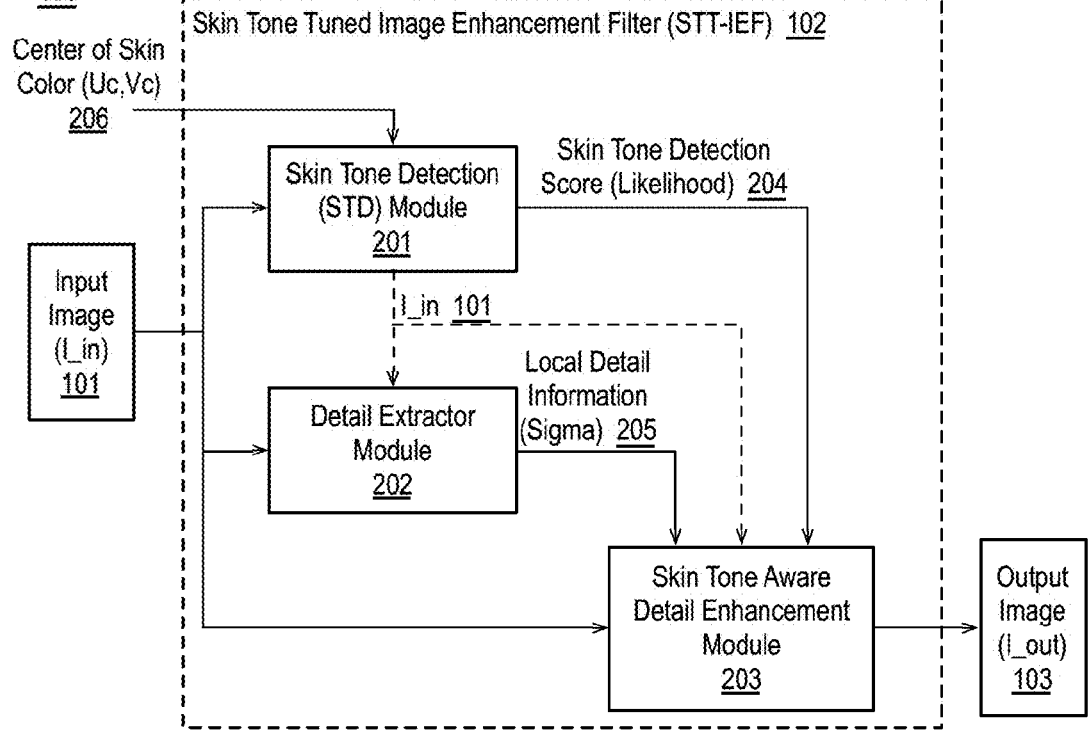
FIG. 2 is a diagram illustrating example modules of the system of FIG. 1.

FIG. 2 is a diagram illustrating example modules of system 100, arranged in accordance with at least some implementations of the present disclosure. As shown, in some examples, skin tone tuned image enhancement filter 102 may include a skin tone detection (STD) module 201, a detail extractor module 202, and a skin tone aware detail enhancement module 203. As shown, skin tone detection module 201, detail extractor module 202, and skin tone aware detail enhancement module 203 may receive input image 101. In an embodiment, skin tone detection module 201, detail extractor module 202, and skin tone aware detail enhancement module 203 may receive input image 101 from an outside source (e.g., a memory or other system component). In other embodiments, skin tone detection module 201 may receive input image 101 from an outside source while detail extractor module 202 and skin tone aware detail enhancement module 203 may receive input image 101 from skin tone detection module 201.

As shown, skin tone detection module 201 may receive input image 101. Also as shown, skin tone detection module 201 may receive a center of skin color (Uc, Vc). Center of skin color 206 may be received from an outside source (e.g., a memory, a driver, or another system component) as shown or center of skin color 206 may be predetermined or the like. Center of skin color 206 may include any data (e.g., Uc, Vc in the YUV color space) indicating a center of skin color such that a pixel having a matching color is likely to be a skin tone pixel. For example, center of skin color 206 may vary based on the expected content of input image 101, a predetermined value, or the like.

Skin tone detection module 201 may determine and/or provide a skin tone detection score (e.g., a likelihood a pixel is a skin tone pixel) 204 for a pixel of input image 101. In various examples, skin tone detection module 201 may provide skin tone detection score 204 for each pixel of input image 101 or for a subset of the pixels of input image 101 as discussed. For example, if a skin tone detection score 204 is provided for each pixel of input image 101, skin tone detection score 204 may comprise a map or surface correlated with input image 101. Skin tone detection score 204 may include any suitable score (e.g., a scaled score) indicating the likelihood a pixel (e.g., an individual pixel, a target pixel, or a current pixel or the like) of input image 204 is a skin tone pixel. In an example, skin tone detection score 204 may range from zero to one, inclusive, such that a score of zero indicates no or a very low likelihood the pixel is a skin tone pixel and a score of one indicates a very high likelihood the pixel is a skin tone pixel and/or a match to center of skin color 206. Skin tone detection score 204 may be provided over any suitable range such as 0 to 1 as discussed, 0 to 100, 0 to 1000 or the like. In other examples, a higher skin tone detection score 204 may indicate low likelihood the pixel is a skin tone pixel and a lower skin tone detection score 204 may indicate a high likelihood the pixel is a skin tone pixel. Many suitable combinations may be available and a most efficient technique may be employed based on implementation details. Further discussions of generating skin tone detection score 204 are provided with respect to FIGS. 3-6 and elsewhere herein.

As shown in FIG. 2, detail extractor module 202 may receive input image 101 and may determine and/or provide local detail information (sigma) 205 for a pixel of input image 101. In various examples, detail extractor module 202 may provide local detail information 205 for each pixel of input image 101 or for a subset of the pixels of input image 101. For example, if local detail information 205 is provided for each pixel of input image 101, local detail information 205 may comprise a map or surface correlated with input image 101. Local detail information 205 may include any suitable value indicating an amount of detail around a pixel (e.g., an individual pixel, a target pixel, or a current pixel or the like). For example, a larger local detail information 205 may indicate a greater amount of detail around a pixel (e.g., edge boundaries or the like at images such as grass, patterns or the like) and a smaller local detail information 205 may indicate a lesser amount of detail around a pixel (e.g., continuous regions or the like such as walls, sky or the like). In some examples, and as is discussed below, larger local detail information 205 pixels may be enhanced to a greater degree than smaller local detail information 205 pixels may be enhanced to a lesser degree based on the value of local detail information 205.

As shown, skin tone aware detail enhancement module 203 may receive input image 101, skin tone detection score(s) 204, and local detail information 205 (e.g., local detail information for one or more pixels of input image 101). Skin tone aware detail enhancement module 203 may perform a skin tone based enhancement of a pixel of input image 101 based on the skin tone detection score 204 and the local detail information 205 associated with the pixel to generate an output pixel of output image 103. In various examples, skin tone aware detail enhancement module 203 may output pixels for each pixel of input image 101 or for a subset of the pixels of input image 101 or the like. In an embodiment, output image 103 may have more enhancement in general areas of the image and less enhancement in skin tone areas of the image. In another embodiment, output image 103 may have less enhancement in general areas of the image and increased enhancement in skin tone areas of the image. In such examples, a user may desire increased enhancement in skin tone areas (instead of the possibly more common desire to decrease enhancement in skin tone areas).

Figure 3:
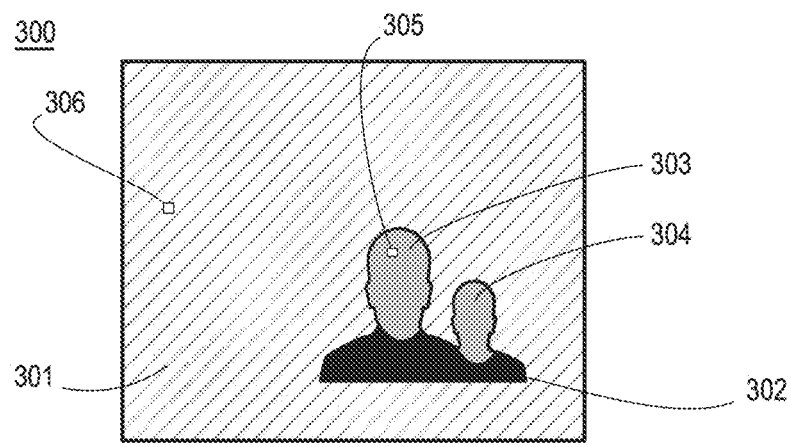
FIG. 3 illustrates an example image.

FIG. 3 illustrates an example image, arranged in accordance with at least some implementations of the present disclosure. As shown in FIG. 3, image 300 may include general areas 301, 302 and skin tone areas 303, 304. General areas 301, 302 may include any areas that are not skin tone areas such as background (e.g., general area 301) and clothing (e.g., general area 302) or the like. As will be appreciated, in some examples, a color in general areas 301, 302 may be deemed a skin tone area and may be processed as such as a false positive or the like. Skin tone areas 303, 304 may include any areas that qualify as skin toned based on skin tone detection score 204 as discussed herein.

As shown in FIG. 3, a pixel 306 may be in general area 301. The skin tone detection score associated with pixel 306 may indicate pixel 306 is not likely to be a skin tone pixel and the local detail information associated with pixel 306 may indicate pixel 306 is in a detailed portion of image 300 (e.g., pixel 306 is a part of an evergreen tree or the like), for example. Also as shown in FIG. 3, a pixel 305 may be in skin tone area 304. The skin tone detection score associated with pixel 304 may indicate pixel 304 is likely to be a skin tone pixel and the local detail information associated with pixel 304 may indicate pixel 304 is not in a detailed portion of image 300 (e.g., pixel 304 is a part of forehead), for example.

As discussed, skin tone aware detail enhancement module 203 may provide enhancement to pixels 304, 306 based on their associated skin tone detection score and local detail information. In an embodiment, pixel 306 may be enhanced more than pixel 304 as is discussed further herein. In another embodiment, pixel 304 may be enhanced more than pixel 306 as is also discussed further herein.

Returning to FIG. 2, as discussed, skin tone aware detail enhancement module 203 may perform a skin tone based enhancement of a pixel of input image 101 based on the skin tone detection score 204 and the local detail information 205 associated with the pixel. In an embodiment, the skin tone based enhancement of the pixel may include modifying the pixel of input image 101 by a skin tone based extracted detail. For example, the skin tone based extracted detail may be added to the input pixel to generate the output pixel. The skin tone based extracted detail may include a product of a skin tone based enhancement factor (e.g., a scaled factor based on skin tone detection score 204), a gain factor (e.g., a traditional gain factor for image enhancement), and local detail information 205. Furthermore, in some embodiments, the skin tone based enhancement discussed herein may be an optional feature that may be enabled or disabled (e.g., by a user, by a driver, or by another system component, or the like).

For example, the skin tone based enhancement may be implemented via Equation (1) as follows:

$$p_{out}(x, y) = \begin{cases} p(x, y) + (1 - \text{sign(smooth?1:}-1) \cdot likelihood^p) \cdot \\ \quad f(E_v(p(x, y), E_h(p(x, y)) \cdot \sigma(p(x, y)), & \text{If } STT\text{-}IEF \text{ is ON} \\ p(x, y) + f(E_v(p(x, y), E_h(p(x, y)) \cdot \sigma(p(x, y)), & \text{otherwise} \end{cases} \quad (1)$$

where $p_{out}(x, y)$ may the output pixel at a position (x, y) in the image (e.g., a gray level or luma or Y value), $p(x, y)$ may be the input pixel at position (x, y) (e.g., a gray level or luma or Y value), $(1-\text{sign(smooth?1:}-1)\times likelihood^p)$ may be the skin tone based enhancement factor, sign(smooth?1:−1) may return a value of 1 to enable smoother skin tone areas and a value of −1 to enable sharper skin tone areas, likelihood$^p$ may be the skin tone detection score (scaled from 0 to 1), $f(E_v(p(x, y)), E_h(p(x, y))$ may be the gain factor (e.g., function $f$ may apply any suitable function such as a monotonic function), $E_v$ may be a vertical gradient dependent detail gain factor or vertical edge metric, $E_h$ may be a horizontal gradient dependent detail gain factor or horizontal edge metric, and σ may be the local detail information. In some examples, Equation (1) may be applied to only the Y (e.g., luma) component of the pixel. In other examples, Equation (1) may be applied to all components, YUV, of the pixel.

As shown, in examples where STT-IEF is on or enabled and smooth? is set to yes (e.g., outputs 1), the skin tone based enhancement factor (e.g., (1−sign(smooth?1:−1)× likelihood$^p$)) may tend toward zero when a pixel is likely to be a skin tone pixel and may tend toward 1 when the pixel is unlikely to be a skin tone pixel. Such a configuration may provide smoother skin tone areas and sharper general areas of an image, for example. In examples where STT-IEF is on or enabled and smooth? is set to no (e.g., outputs −1), the skin tone based enhancement factor (e.g., (1−sign (smooth?1:−1)×likelihood$^p$)) may be greater than zero when a pixel is likely to be a skin tone pixel and may tend toward 1 when the pixel is unlikely to be a skin tone pixel. Such a configuration may provide even sharper skin tone areas than general areas (which may also be sharpened) of an image, for example. Such examples may provide users or a software driver with the functionality of maintaining smoothness in skin areas or regions and also the flexibility to enhance details in the skin areas or regions more than that provided to general non-skin content of an image.

In examples where STT-IEF is off or disabled, the skin tone based enhancement factor (e.g., (1−sign(smooth?1:−1)×likelihood$^p$)) may be disabled and the enhancement of all pixels may be independent of the likelihood of being a skin tone.

As shown, the skin tone based extracted detail (e.g., (1−sign(smooth?1:−1)×likelihood$^p$)×$f(E_v(p(x, y)), E_h(p(x, y))$×σ(p(x, y))) may be a product of a skin tone based enhancement factor (e.g., (1−sign(smooth?1:−1)×likelihood$^p$)), a gain factor (e.g., $f(E_v(p(x, y)), E_h(p(x, y))$), and the local detail information (e.g., σ(p(x, y))). Also as shown, in some examples, the skin tone based enhancement factor may include one minus the skin tone detection score (e.g., when smooth?1:−1 is set to 1), the skin tone detection score may be between zero and one, and the skin tone detection score may be proportional to a likelihood the individual pixel is a skin tone. Also as shown, in some examples, the skin tone based enhancement factor may include one plus the skin tone detection score (e.g., when smooth?1:−1 is set to −1), the skin tone detection score may be between zero and one, and the skin tone detection score may be proportional to a likelihood the individual pixel is a skin tone. Furthermore, in some examples, the gain factor may be determined based on a monotonic function applied to a vertical gradient dependent detail gain factor and a horizontal gradient dependent detail gain factor.

Discussion now turns to example details associated with the above discussion and, in particular, Equation (1).

As discussed, a gain factor (e.g., $f(E_v(p(x, y)), E_h(p(x, y))$) may be determined (e.g., by skin tone aware detail enhancement module 203) as a part of performing the skin tone based enhancement. The function, $f$, used to determine the gain factor may be any suitable function such as a monotonic function or the like. Also as discussed, function, $f$, may be applied to a vertical gradient dependent detail gain factor (e.g. $E_v(p(x, y))$) and a horizontal gradient dependent detail gain factor (e.g., $E_h(p(x, y))$). In some examples, the vertical gradient dependent detail gain factor and the horizontal gradient dependent detail gain factor may be determined based on a convolution of a Sobel kernel, which may provide an edge metric, and a pixel as shown in Equations (2) and (3):

$$E_v(p(x,y)) = \begin{bmatrix} -1 & 0 & 1 \\ -2 & 0 & 2 \\ -1 & 0 & 1 \end{bmatrix} * p(x, y) \qquad (2)$$

$$E_h(p(x,y)) = \begin{bmatrix} -1 & -2 & -1 \\ 0 & 0 & 0 \\ 1 & 2 & 1 \end{bmatrix} * p(x, y) \qquad (3)$$

where the 3 by 3 matrices comprise Sobel kernels and the * indicates a convolution operation.

Furthermore, as discussed, local detail information 205 (e.g., a) may be determined by detail extractor module 202 based on input image 101. In some examples, local detail information 205 may be a difference between a first local detail information for a first window around the individual pixel and a second local detail information for a second window around the individual pixel such that the first window is larger than the second window. For example, the larger window may be a 5 by 5 window and the smaller window may be a 3 by 3 window. For example, as discussed, local detail information may be extracted for each pixel (or some pixels) of input image I_in. In such an example, the resolution of input image I_in may be W×H and a pixel within I_in may be denoted as above as p(x, y) and such that x=0, 1, . . . , W−1 and y=0, 1, . . . , H−1 may be image coordinates. In an embodiment, local detail information 205 may be determined according to Equations (4) through (7) as follows:

$$\sigma(p(x,y)) = \sigma(N_5(p(x,y))) - \sigma(N_3(p(x,y))) \qquad (4)$$

$$\sigma(N_5(p(x,y))) = w_{5C}[d(2,0)+d(-2,0)+d(0,-2)+d(0,2)] + \\ w_{5X}[d(2,2)+d(-2,2)+d(2,-2)+d(-2,-2)]+w_{5CX}[d \\ (2,1)+d(-2,1)+d(1,-2)+d(-1,-2)+d(-2,-1)+d(2,- \\ 1)+d(1,2)+d(-1,2)] \qquad (5)$$

$$\sigma(N_3(p(x,y))) = w_{3C}[d(1,0)+d(-1,0)+d(0,-1)+d(0,1)] + \\ w_{3X}[d(1,1)+d(-1,1)+d(1,-1)+d(-1,-1)] \qquad (6)$$

$$d(i,j) = p(x+i, y+j) - p(x, y) \qquad (7)$$

where $N_5$ may indicate a 5 by 5 window around the pixel and $N_3$ may indicate a 3 by 3 window around the pixel, where d(i, j) may be a gray-level (e.g., luma component) difference between the pixel (e.g., p(x, y)) and the neighboring pixel being evaluated (e.g., at coordinates (2,1) or (−1,0) with respect to p(x, y) or the like), and where $w_{5C}$, $w_{5X}$, $w_{5CX}$, $w_{3C}$, and $w_{5X}$ may be configurable state parameters enabling different weightings on gradients from different orientations or shapes with respect to the pixel, p(x, y).

As discussed, skin tone detection module 201 may determine skin tone detection score 204 based on input image 101 and center of skin color 206.

Figure 4:
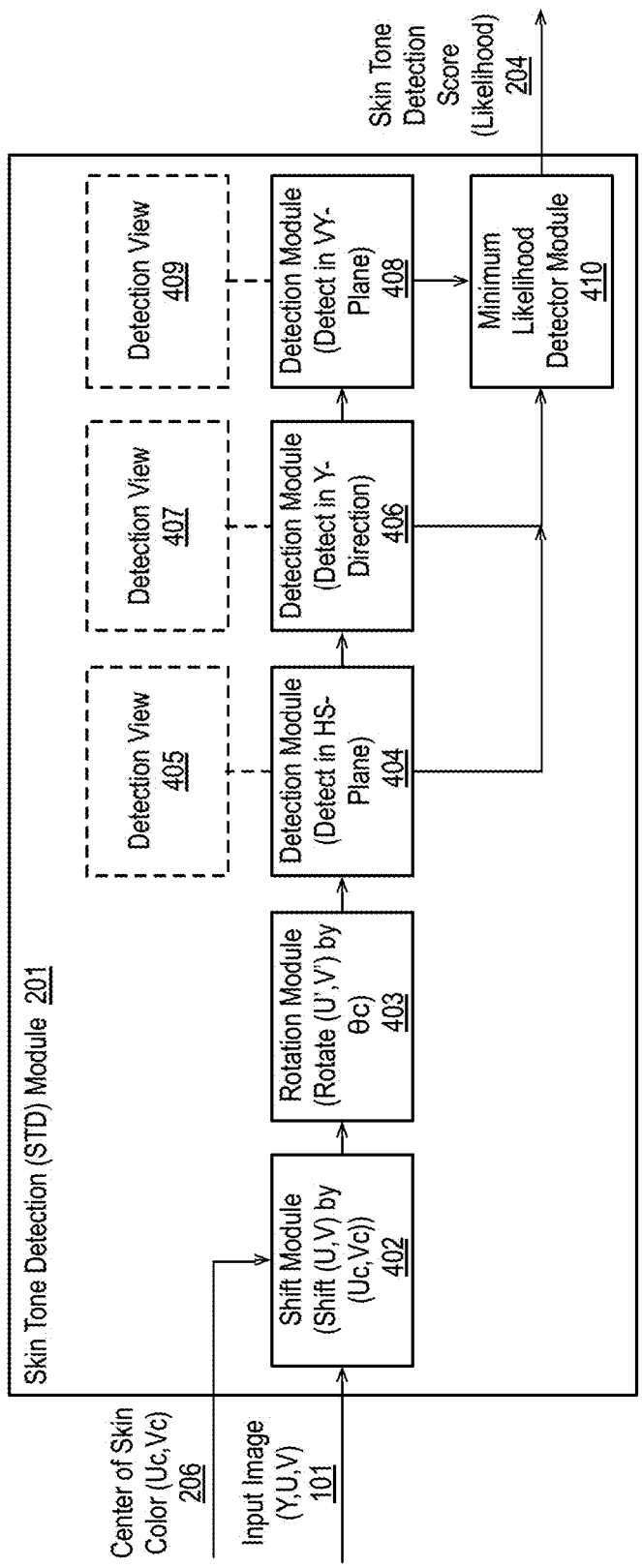
FIG. 4 is an illustrative diagram of an example skin tone detection module.

FIG. 4 is an illustrative diagram of example skin tone detection module 201, arranged in accordance with at least some implementations of the present disclosure. As shown in FIG. 4, skin tone detection module 201 may include a shift module (Shift (U, V) by (Uc, Vc) module 402, a rotation (rotate (U', V') by Θc) module 403, a detection (detect in HS-plane) module 404, a detection (detect in Y-direction) module 406, a detection (detect in VY-plane) module 408, and a minimum likelihood detector module 410. Also as shown, skin tone detection module 201 may receive center of skin color 206 and input image 101, and skin tone detection module 201 may output skin tone detection score 204.

In an example, skin tone detection module 201 may determine skin tone detection score 204 as a minimum of a likelihood an input pixel (e.g., a pixel in the YUV color space) of a likelihood of the pixel being skin toned in a UV plane, a likelihood of the individual pixel being skin toned in a VY plane, and a third likelihood of the individual pixel being skin toned over the Y axis. For example, the distribution of skin color may be viewed statistically as a cluster spanning in the 3D YUV domain such that the center of the cluster (e.g., center of skin color 206) may considered as the 'exact' skin tone value. The detection of such 3D cluster may be performed by taking the intersection of the 3D cluster projections onto three planes (i.e., UV, YV and YU).

In some examples, the distribution of a skin color may be viewed statistically as a cluster spanning in the 3D YUV domain such that the center of the cluster is considered the "exact" skin tone value (e.g., the center of the cluster may be center of skin color 206). If a pixel matches the center of the cluster, the likelihood it is a skin tone pixel may be maximized and the likelihood may decrease as it moves away from the center within the cluster and the likelihood may be zero outside of the cluster. Any technique may be used to determine whether an input pixel is within the cluster and to determine its skin tone detection score based on its proximity to the center of the cluster. In an embodiment, the detection of whether an input pixel is within the cluster may be performed by taking the intersections of the cluster's projections onto three planes (e.g., the UV plane or VU plane, the YV plane or VY plane, and the YU or UY plane; please note the plane notations may be used interchangeably).

In the UV plane projection, the distribution of skin color may result in an ellipse shape projected on the UV plane. In some examples, the ellipse shape in the UV plane may be approximated by a rectangle and a diamond shape in a transformed coordinate plane (e.g., a hue-saturation domain). The input pixel may be approximated based on its YUV value into the hue-saturation domain and it may be determined whether the input pixel is within the rectangle and diamond shape (e.g., an enclosure formed based on the rectangle and diamond shape). If the input pixel falls outside of the enclosure, the likelihood the pixel is a skin tone pixel in the UV plane (e.g., likelihood$^P{}_{UV}$) is zero. If the input pixel falls within the enclosure, the likelihood the pixel is a skin tone pixel in the UV plane (e.g., likelihood$^P{}_{UV}$) may be determined based on a function modeling the distance relationship between the input pixel and the transformed/projected center of the cluster). For example, the function may calculate the likelihood that increases from zero to one as a pixel moves toward center of skin color 206 (e.g., Uc, Vc). In some examples, for the likelihood to be a value of one, the pixel does not need to be at the exact center. For example, a region around the center may include a value of one for the pixel.

For example, the skin tone cluster in a 3D YUV domain (such that the center of the cluster may be the center of skin color) may be projected onto the UV plane to generate a UV projection. For example, the projection may be performed via detection module 404. The UV projection may be transformed to a hue-saturation domain to generate a transformed projection and the shape of the transformed projection (e.g., an ellipse) may be approximated based on an enclosure in the hue-saturation domain (e.g. an enclosure using a rectangle and a diamond). For example, the transformation and enclosure generation may be performed via detection module 404. The enclosure in the transformed coordinate (i.e., HS domain or SH domain, which may be used interchangeably) may be utilized to approximate the shape of the projection to facilitate the detection of the projection in UV plane. A likelihood the pixel is a skin tone pixel in the UV plane (e.g., likelihood$^P{}_{UV}$) may be determined as zero when an approximation of the pixel is outside of the enclosure or based on a distance relationship between an approximation of the individual pixel in the hue-saturation domain and the center of the cluster in the hue-saturation domain when the approximation of the individual pixel in the hue-saturation domain is within the enclosure. For example, the determination of whether an approximation of the pixel is within the enclosure and the determination of the likelihood (if applicable) may be performed via detection module 404.

As discussed, a likelihood a pixel is a skin tone pixel in the UV plane may be performed via detection module 404. Such a likelihood determination may be illustrated via a detection view 405, which is presented in FIG. 5.

Figure 5:
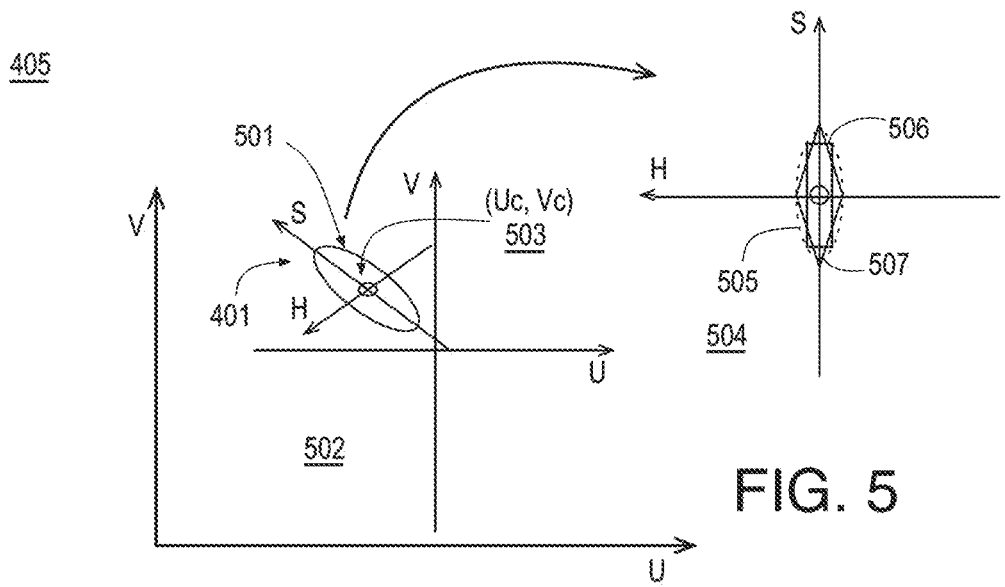
FIG. 5 illustrates an example detection view in the UV plane.

FIG. 5 illustrates an example detection view 405 in the UV plane, arranged in accordance with at least some implementations of the present disclosure. As shown, a projection 501 of the 3D cluster may be formed in UV plane 502. Also as shown, in some examples, projection 501 may be an ellipse. In the illustrated example, projection 501 may be an ellipse that has been shifted and or rotated as is discussed further herein. Also as shown, projection 501 may be centered around center (Uc, Vc) 503, which may be center of skin color 206 as discussed herein. As shown, projection 501 may be transformed to a hue-saturation (HS) domain 504 to generate a transformed projection 505 (shown in with a dotted line). Transformed projection 505 may be approximated via an enclosure based on, for example, rectangle 506 and diamond 507. For example, the enclosure may include the outside boundary provided by rectangle 506 and diamond 507. Although illustrated via rectangle 506 and diamond 507, any shape or combination of shapes may be used to generate the enclosure. In some examples, only a rectangle may be used. In other examples, only a diamond may be used. In various other examples, squares, triangles, or the like may be used.

Returning now to FIG. 4, in the VY plane, the projection onto the VY plane based on the 3D cluster as discussed may be enclosed by a piece-wise linear function or functions (e.g., two piece-wise linear functions). As discussed above with respect to the UV plane, if the input pixel falls outside of the enclosure provided via the piece-wise linear function (s), the likelihood the pixel is a skin tone pixel in the YV plane (e.g., likelihood$^P{}_{YV}$) is zero. If the input pixel falls within the enclosure, the likelihood the pixel is a skin tone pixel in the YV plane (e.g., likelihood$^P{}_{YV}$) may be determined based on a function modeling the distance relationship between the input pixel and the projected center of the cluster). For example, the function may calculate the likelihood that increases from zero to one as a pixel moves from an edge of the enclosure toward center of skin color 206 (e.g., Vc, Yc). In some examples, for the likelihood to be a value of one, the pixel does not need to be at the exact center. For example, a region around the center may include a value of one for the pixel.

For example, the skin tone cluster in the 3D YUV domain (such that the center of the cluster may be the center of skin color) as discussed may be projected onto the YV plane to generate a YV projection. For example, the projection may be performed via detection module 408. The YV projection may be enclosed based on a piece-wise linear function or functions (e.g., two piece-wise linear functions) and a likelihood an input pixel is a skin tone pixel in the YV plane (e.g., likelihood$^P{}_{YV}$) may be determined as zero when the pixel is outside of the enclosure or based on the pixel and the piece-wise linear functions when the individual pixel is within the enclosure. For example, the likelihood may be based on a distance relationship between the individual pixel in the YV plane and the center of the cluster in the YV plane when the approximation of the individual pixel in the hue-saturation domain is within the enclosure. For example, the determination of whether the pixel is within the enclosure provided by the piece-wise linear function(s) and the determination of the likelihood (if applicable) may be performed via detection module 408.

As discussed, a likelihood a pixel is a skin tone pixel in the YV plane may be performed via detection module 408. Such a likelihood determination may be illustrated via a detection view 409, which is presented in FIG. 6.

Figure 6:
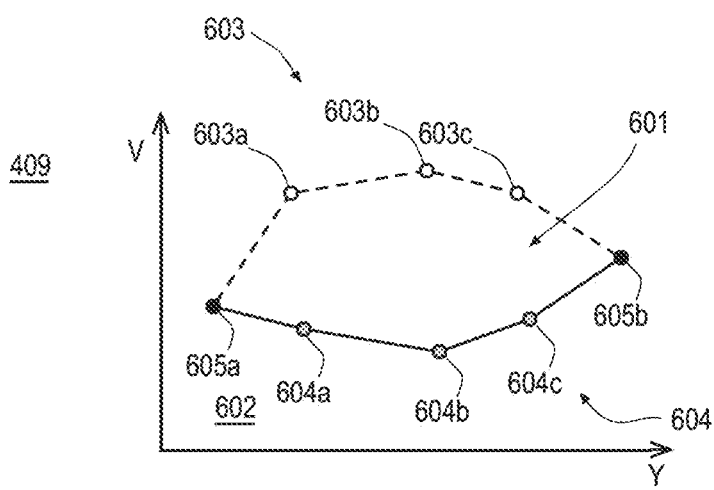
FIG. 6 illustrates an example detection view in the YV plane.

FIG. 6 illustrates an example detection view 409 in the YV plane, arranged in accordance with at least some implementations of the present disclosure. As shown, a projection 601 of the 3D cluster may be formed in YV plane 602. Please note in FIG. 6, the precise edges of projection 601 are not show for the sake of clarity of presentation. In some examples, projection 601 may be centered around a center (Vc, Yc), which may be center of skin color 206 as discussed herein. In some examples, projection 601 may be approximated via a piece-wise linear function 603 (e.g., including points 603a, 603b, 603c and 605a and 605b) and a second piece-wise linear function 604 (e.g., including points 604a, 604b, 604c and 605a and 605b). For example, points 605a and 605b may be shared between piece-wise linear functions 603 and 604. Although illustrated via piece-wise linear functions 603 and 604, each including 3 independent points and 2 shared points, any number of piece-wise linear functions (e.g., 1 or 3 or the like) including any number of points may be used. Further, share points need not be used. For example, the number and or complexity piece-wise linear functions may be based on the complexity of projection 601, a predetermined threshold (e.g., depending on a desired granularity) or the like.

Returning now to FIG. 4, in the YU plane, the projection may be further simplified by performing a projection just over the Y axis. For example, the 3D cluster as discussed may be projected onto or over the Y axis and the projection may be enclosed by a piece-wise linear function. As discussed above with respect to the UV plane and the VY plane, if the input pixel falls outside of the enclosure provided via the piece-wise linear function, the likelihood the pixel is a skin tone pixel in the YU plane (e.g., likelihood$^P{}_{YU}$=likelihood$^P{}_Y$) is zero. If the input pixel falls within the enclosure, the likelihood the pixel is a skin tone pixel in the YU plane (e.g., likelihood$^P{}_{YU}$=likelihood$^P{}_Y$) may be determined based on a function modeling the distance relationship between the input pixel and the projected center of the cluster). For example, the function may calculate the likelihood that increases from zero to one as a pixel moves from an edge of the enclosure toward center of skin color 206 (e.g., Yc, Uc or Yc). In some examples, for the likelihood to be a value of one, the pixel does not need to be at the exact center. For example, a region around the center may include a value of one for the pixel.

For example, the skin tone cluster in the 3D YUV domain (such that the center of the cluster may be the center of skin color) as discussed may be projected onto the Y axis to generate a Y projection. For example, the projection may be performed via detection module 406. The Y projection may be enclosed based on a piece-wise linear function and a likelihood an input pixel is a skin tone pixel in the Y axis (e.g., likelihood$^P{}_{YU}$=likelihood$^P{}_Y$) may be determined as zero when the pixel is outside of the enclosure or based on the pixel and the piece-wise linear functions when the individual pixel is within the enclosure. For example, the likelihood may be based on a distance relationship between the individual pixel in the YV plane and the center of the cluster in the YV plane when the approximation of the individual pixel in the hue-saturation domain is within the enclosure. For example, the determination of whether the pixel is within the enclosure provided by the piece-wise linear function(s) and the determination of the likelihood (if applicable) may be performed via detection module 406.

As discussed, a likelihood a pixel is a skin tone pixel in the YU plane (or in the Y axis domain) may be performed via detection module 406. Such a likelihood determination may be illustrated via a detection view 407, which is presented in FIG. 7.

Figure 7:
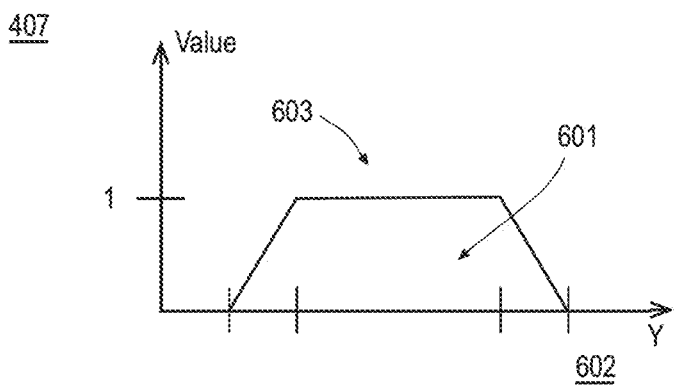
FIG. 7 illustrates an example detection view over the Y axis.

FIG. 7 illustrates an example detection view 407 over the Y axis, arranged in accordance with at least some implementations of the present disclosure. As shown, a projection 601 of the 3D cluster may be formed over Y axis 602. Please note in FIG. 7, the precise boundary of projection 601 is not show for the sake of clarity of presentation. In some examples, projection 601 may be centered around a center (Yc), which may be center of skin color 206 as discussed herein. In some examples, projection 601 may be approximated via a piece-wise linear function 602. For example, the input pixel's Y value may be used to index the likelihood an input pixel is a skin tone pixel in the Y axis (e.g., likelihood$^P{}_{YU}$=likelihood$^P{}_Y$) based on piece-wise linear function 602.

Returning now to FIG. 4, an example operation of skin tone detection module 201 may now be provided. As shown, skin tone detection module 201 may receive center of skin color 206 and input image 101. For example, input image 101 may include a UV distribution of all the pixels in input image 101. At shift module 402, pixels of input image 101 may be shifted by Uc, Vc (e.g., U, V values of the pixels may be shifted by Uc, Vc by subtracting Uc and Vc from U, V, respectively, to generate U', V'). As discussed, Uc, Vc may be center of skin color 206. Also as discussed, center of skin color 206 may be a configurable parameter. For example, center of skin color 206 may be configured via an application using a driver or the like. For example, an independent software vendor (ISV) may control center of skin color 206 using a driver. Center of skin color 206 may include any suitable values that approximate a skin color. For example U, V values for center of skin color 206 may in the range of about 100-120 and 144-164, with values of U=110 and V=154 being particularly advantageous.

At rotation module 403, the shifted pixel values (e.g., U', V') may be rotated by a rotation conversion factor, Θc. For example, the rotation conversion factor may be configurable as discussed with respect o center of skin color 206. The rotation conversion factor may represent a rotation conversion (e.g., a counter clockwise rotation) from YUV to the hue-saturation (HS) domain. For example, the rotation conversion factor, Θc, may be used to approximate a conversion from the YUV domain to the HS domain.

At detection module 404, a likelihood a pixel in input image 101 is a skin tone pixel in the UV plane (e.g., likelihood$^P_{UV}$) may be determined as discussed herein. At detection module 406, a likelihood a pixel in input image 101 is a skin tone pixel in the YU plane or in the Y axis (e.g., likelihood$^P_{YU}$=likelihood$^P_Y$) may be determined as discussed herein. At detection module 408, a likelihood a pixel in input image 101 is a skin tone pixel in the YV plane (e.g., likelihood$^P_{YV}$) may be determined as discussed herein. Although illustrated in a serial manner for the sake of clarity in FIG. 4, the operations of modules 404, 406, 408 may be performed substantially in parallel or in any order.

As shown in FIG. 4, the likelihoods from modules 404, 406, 408 (e.g., likelihood$^P_{UV}$, likelihood$^P_{YU}$=likelihood$^P_Y$, and likelihood$^P_{YV}$) may be transmitted to minimum likelihood detector module 410. Minimum likelihood detector module 410 may determine a minimum from the provided likelihoods and provide the minimum as skin tone detection score 204. For example, the skin tone detection score 204 may be determined via Equation (8) as follows:

$$\text{likelihood}^P=\min(\text{likelihood}_{UV},\text{likelihood}_{VY},\text{likelihood}_Y)\in[0,1] \quad (8)$$

where likelihood$^P$ may be the skin tone detection score for pixel p. As shown, in some examples, the skin tone detection score may be between zero and one. As discussed, skin tone detection score 204 may be provided to skin tone aware detail enhancement module 203 for implementation as discussed herein. For additional information associated with the operations associated with FIGS. 4-7, please refer to U.S. patent application Ser. No. 12/985,461, filed Jan. 6, 2011, and titled "System, Method and Computer Program Product for Color Processing of Point-of-Interest Color", now U.S. Pat. No. 8,493,402.

Figure 8:
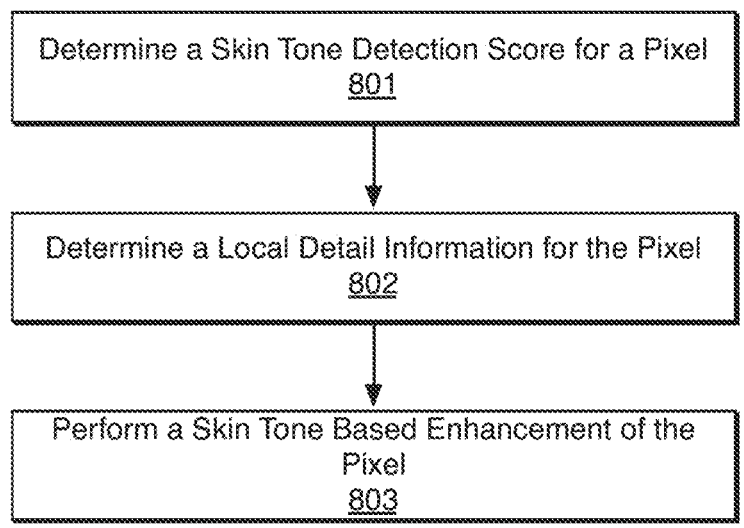
FIG. 8 is a flow diagram illustrating an example process for providing image enhancement.

FIG. 8 is a flow diagram illustrating an example process 800 for providing image enhancement, arranged in accordance with at least some implementations of the present disclosure. Process 800 may include one or more operations 801-803 as illustrated in FIG. 8. Process 800 may form at least part of an image enhancement process. By way of non-limiting example, process 800 may form at least part of an image enhancement process for one or more input images as undertaken by system 100 as discussed herein. Further, process 800 will be described herein in reference to system 900 of FIG. 9.

Figure 9:
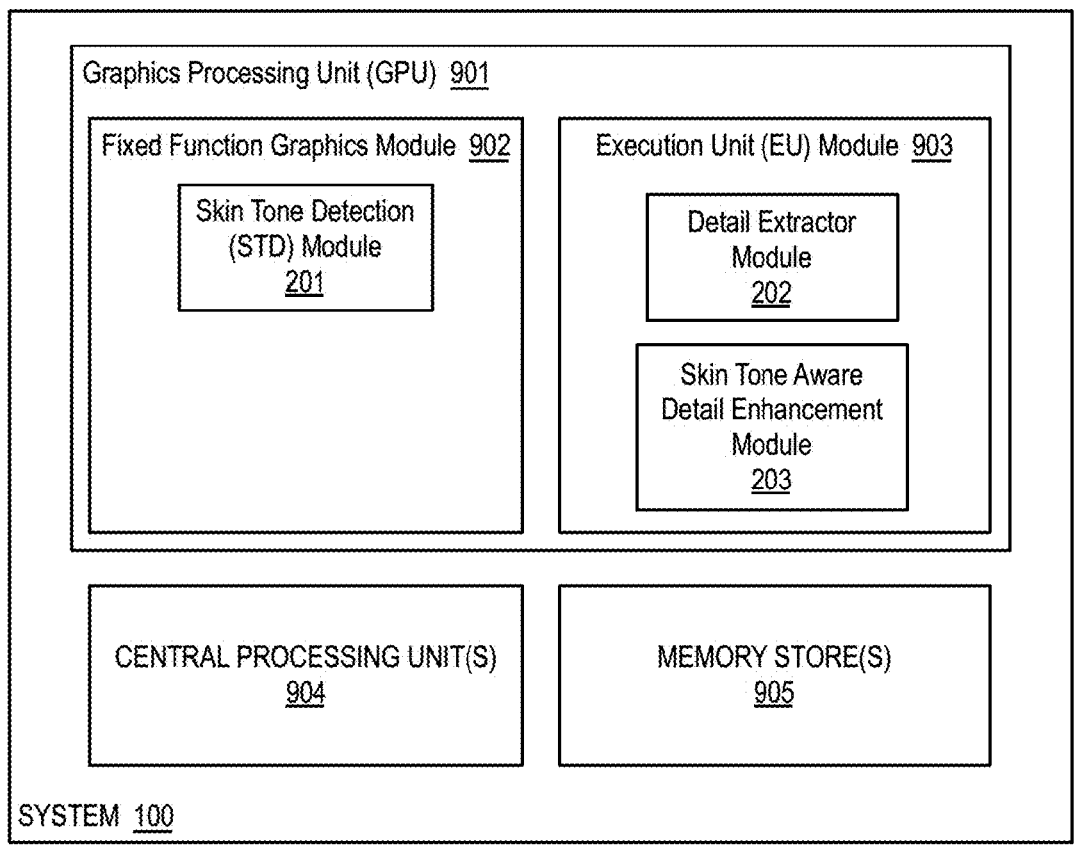
FIG. 9 is an illustrative diagram of an example system.

FIG. 9 is an illustrative diagram of an example system 900, arranged in accordance with at least some implementations of the present disclosure. As shown in FIG. 9, system 900 may include a graphics processing unit (GPU) 901, one or more central processing units 904, and memory stores 905. Also as shown, GPU 901 may include a fixed function graphics module 902, which may include or implement skin tone detection module 201, and an execution (EU) module 903, which may include or implement detail extractor module 202 and/or skin tone aware detail enhancement module 203. In the example of system 900, memory stores 905 may store image content such as input images and/or output images.

In an embodiment, fixed function graphics module 902 may include dedicated logic or circuitry and may provide a set of fixed function entry points that may map to the dedicated logic for a fixed purpose or function. For example, fixed function graphics module 902 may be provided as a part of GPU 901 and may be tuned to provide, for example, a skin tone detection score by providing the proper arguments (e.g., via a driver or the like). The arguments may include a center of color (e.g., center of skin color), a rotation conversion factor (e.g., Θc), and/or an input image, or the like. As shown, fixed function graphics module 902 may include or implement skin tone detection module 201.

In an embodiment, EU module 903 may include programmable logic or circuitry such as a logic core or cores that may provide a wide array of programmable logic functions. As shown, EU module 903 may include or implement detail extractor module 202 and/or skin tone aware detail enhancement module 203. In some examples, fixed function graphics module 902 may offer the advantage of being faster while EU module 903 may be slower but may offer the advantage of being more widely programmable.

Central processing units 904 may include any number and type of processing units or modules that may provide control and other high level functions for system 900. Memory stores 905 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 905 may be implemented by cache memory.

Returning to discussion of FIG. 8, process 800 may begin at operation 801, "Determine a Skin Tone Detection Score for a Pixel", where a skin tone detection score for an individual pixel of an input image may be determined. For example, skin detection score 204 may be determined for an individual pixel of input image 101 via skin tone detection module 201 of skin tone tune image enhancement filter 102. For example, skin tone detection module 201 may be implemented via fixed function graphics module 902, which may be provided as a part of GPU 901. In an example, skin detection score 204 may be determined as a minimum of a first likelihood of the individual pixel being skin toned in a UV plane, a second likelihood of the individual pixel being skin toned in a VY plane, and a third likelihood of the individual pixel being skin toned over the Y axis. The first, second, and third likelihoods may be determined as discussed herein and, in particular, as discussed with respect to FIGS. 4-7.

Process 800 may continue at operation 802, "Determine a Local Detail Information for the Pixel", where a local detail information may be determined for the individual pixel. For example, local detail information 205 may be determined for an individual pixel of input image 101 via detail extractor module 202 of skin tone tune image enhancement filter 102. For example, detail extractor module 202 may be implemented via EU module 903, which may be provided as a part of GPU 901. In an example, local detail information 205 may be determined as a difference (e.g., a gray-level difference) between a first local detail information for a first window around the individual pixel and a second local detail information for a second window around the individual pixel such that the first window is larger than the second window as discussed herein.

Process 800 may continue at operation 802, "Perform a Skin Tone Based Enhancement of the Pixel", where a skin tone based enhancement of the individual pixel may be performed based on the skin tone detection score and the local detail information to generate an individual output pixel of an output image. For example, a skin tone based enhancement of an individual pixel of input image 101 may be performed via skin tone aware detail enhancement module 203 of skin tone tune image enhancement filter 102 based on skin detection score 204 and local detail information 205. For example, skin tone aware detail enhancement module 203 may be implemented via EU module 903, which may be provided as a part of GPU 901. In an example, the skin tone based enhancement of the individual pixel of input image 101 may include modifying the individual pixel by a skin tone based extracted detail (e.g., a product of a skin tone based enhancement factor based on skin detection score 204, a gain factor, and local detail information 205).

As discussed, process 800 may be repeated any number of times either in series or in parallel for any number or all of the pixels of input image 101 and similarly for any number of input images to generate any number of output images. Also as discussed, the input image(s) may include a decoded image, a captured image (e.g., via a camera or the like), a rendered image, or an image from a sequence of video images or frames, or the like. Furthermore, the skin tone based enhancement may include a smoothing (e.g., reduced sharpening) of skin areas or an increased sharpening of skin areas based on an input parameter, or the skin tone based enhancement may be disabled based on a parameter.

Various components of the systems described herein may be implemented in software, firmware, and/or hardware and/or any combination thereof. For example, various components of system 100 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Figure 10:
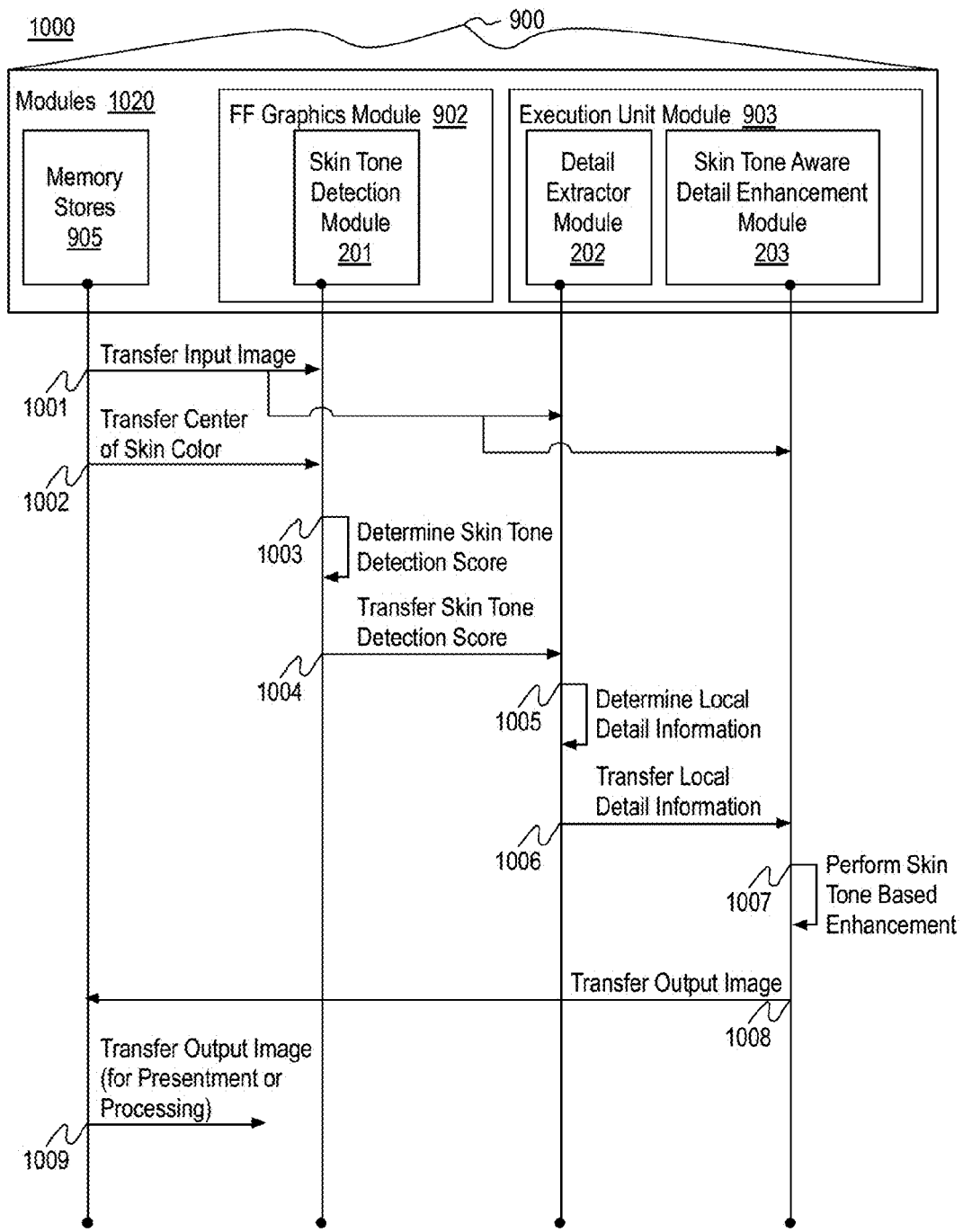
FIG. 10 is an illustrative diagram of an example image enhancement process in operation.

FIG. 10 is a flow chart illustrating an example image enhancement process 1000, arranged in accordance with at least some implementations of the present disclosure. In the illustrated implementation, process 1000 may include one or more operations 1001-1009. By way of non-limiting example, process 1000 will be described herein with reference to example system 900.

Process 1000 may be utilized as a computer-implemented method for performing image enhancement. Process 1000 may begin at operation 1001, "Transfer Input Image", where an input image may be transferred from memory stores 905 to one or more of skin tone detection module 201, detail extractor module 202, and skin tone aware detail enhancement module 203 as discussed herein. For example, input image 101 may be retrieved from a memory such as memory stores 905. For example, the pixels or regions of pixels of input image 101 may be accessed. Input image 101 may include a decoded image, a captured image, a rendered image or an image from a sequence of video images, or the like. Prior to retrieving the input image and or prior to determining a skin tone detection score, the input image may be converted from a first color space to a second color space. For example, the first color space may be an RGB color space and the second color space may be a YUV color space. The conversion may be performed by GPU 901 or central processing unit(s) 904 or the like.

Processing may continue from operation 1001 to operation 1002, "Transfer Center of Skin Color", where a center of skin color may be transferred from memory stores 905 to skin tone detection module 201. In some examples, the center of skin color may be placed in memory via a driver such as a software driver or the like. Although not shown in process 1000, in some examples, a rotation conversion factor may also be rotation transferred from memory stores 905 to skin tone detection module 201. In some examples, the rotation conversion factor may also be placed in memory via a driver such as a software driver or the like.

Processing may continue from operation 1002 to operation 1003, "Determine Skin Tone Detection Score", where a skin tone detection score may be determined for a pixel or pixels of an input image. For example, a skin tone detection score may be determined via skin tone detection module 201 of fixed function graphics module 902 using any technique or techniques as discussed herein.

Processing may continue from operation 1003 to operation 1004, "Transfer Skin Tone Detection Score", where the skin tone detection score for the pixel or pixels may be transferred from skin tone detection module 201 of fixed function graphics module 902 to detail extractor module 202 of EU module 903.

Processing may continue from operation 1004 to operation 1005, "Determine Local Detail Information", where local detail information may be determined for a pixel or pixels of an input image. For example, local detail information may be determined via detail extractor module 202 of EU module 903 using any technique or techniques as discussed herein.

Processing may continue from operation 1005 to operation 1006, "Transfer Local Detail Information", where the local detail information for the pixel or pixels may be transferred from detail extractor module 202 of EU module 903 to skin tone aware detail enhancement module 203 of EU module 903.

Processing may continue from operation 1006 to operation 1007, "Perform Skin Tone Based Enhancement", where a skin tone based enhancement may be performed for the pixel or pixels of the input image to generate pixel or pixels of an output image. For example, a skin tone based enhancement may be performed via skin tone aware detail enhancement module 203 of EU module 903 using any technique or techniques as discussed herein.

Processing may continue from operation 1007 to operation 1008, "Transfer Output Image", where an output image may be transferred from skin tone aware detail enhancement module 203 of EU module 903 to memory stores 905. For example, the output image may be configured for storage, presentment via a display device, or encoding via an encoder or the like. In some examples, the output image may be provided to an application layer.

Processing may continue from operation 1008 to operation 1009, "Transfer Output Image", where the output image may be transferred. For example, the output image may be transferred from memory stores 905 to another module or modules of system 900 for further image enhancement, presentment, encoding, storage, or the like.

In general, process 1000 may be repeated any number of times either serially or in parallel for any number of pixels, images, portions of images, or sequences of images or frames, or blocks of video frames, or the like.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100 or 900, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
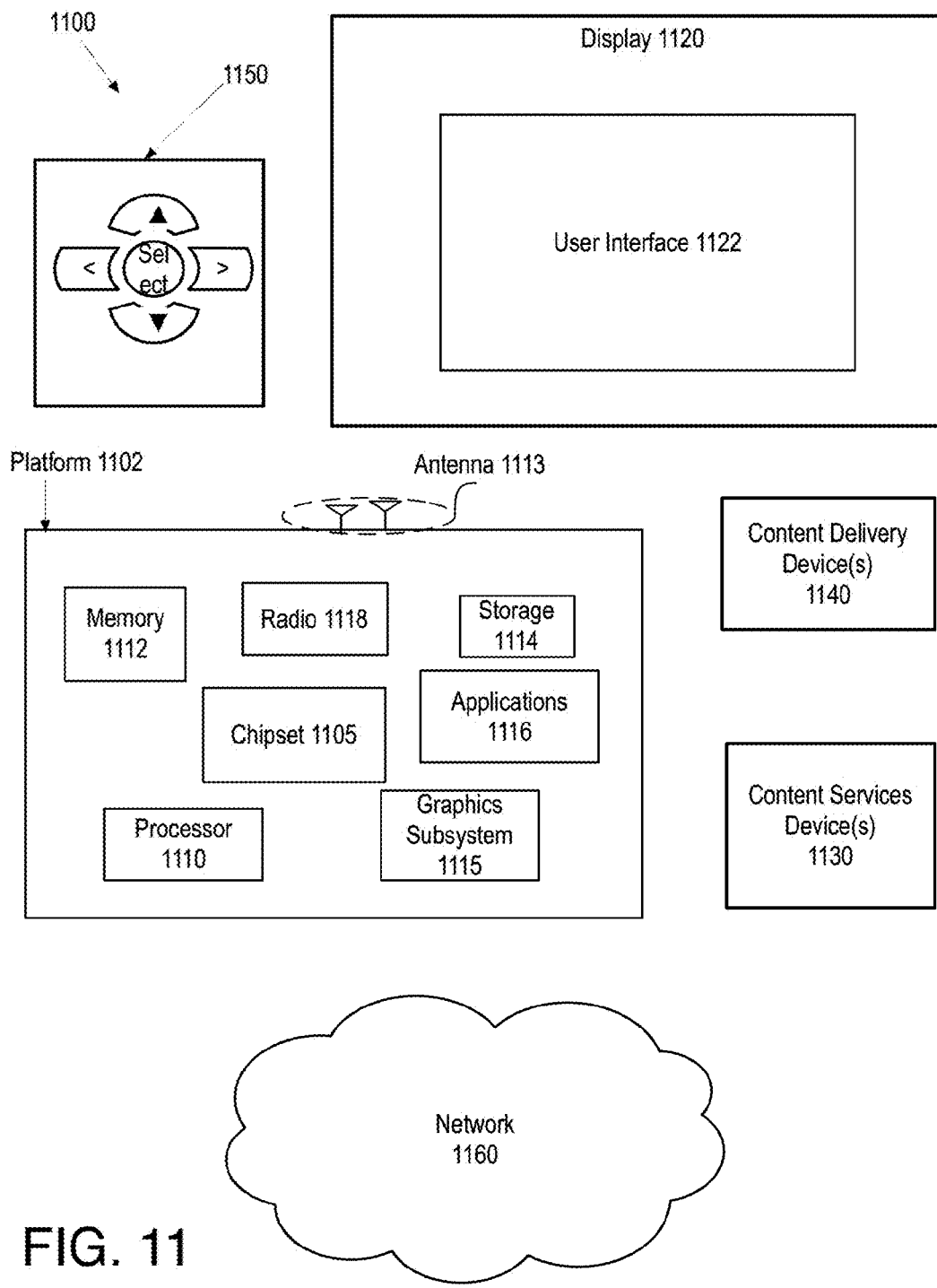
FIG. 11 is an illustrative diagram of an example system.

FIG. 11 is an illustrative diagram of an example system 1100, arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120.

Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of unidirectionally or bidirectionally communicating content between content providers and platform 1102 and/display 1120, via network 1160 or directly. It will be appreciated that the content may be communicated unidirectionally and/or bidirectionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
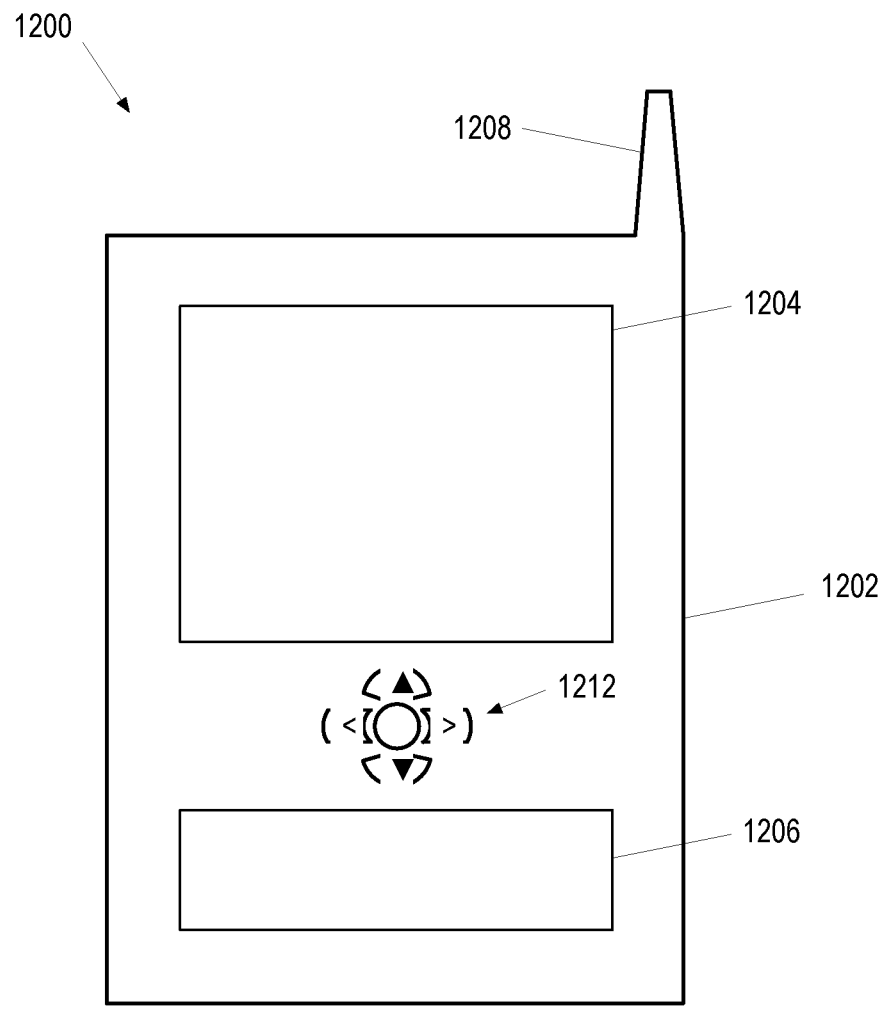
FIG. 12 illustrates an example device, all arranged in accordance with at least some implementations of the present disclosure.

As described above, system 1100 may be embodied in varying physical styles or form factors. FIG. 12 illustrates implementations of a small form factor device 1200 in which system 1200 may be embodied. In various embodiments, for example, device 1200 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing 1202, a display 1204, an input/output (I/O) device 1206, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 1200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for image enhancement comprises determining a skin tone detection score for an individual pixel of an input image, determining a local detail information for the individual pixel, and performing a skin tone based enhancement of the individual pixel based on the skin tone detection score and the local detail information to generate an individual output pixel of an output image.

Further to the first embodiments, performing the skin tone based enhancement of the individual pixel comprises modifying the individual pixel by a skin tone based extracted detail.

Further to the first embodiments, performing the skin tone based enhancement of the individual pixel comprises modifying the individual pixel by a skin tone based extracted detail and the skin tone based extracted detail comprises a product of a skin tone based enhancement factor, a gain factor, and the local detail information.

Further to the first embodiments, performing the skin tone based enhancement of the individual pixel comprises modifying the individual pixel by a skin tone based extracted detail and the skin tone based extracted detail comprises a product of a skin tone based enhancement factor, a gain factor, and the local detail information and the skin tone based enhancement factor comprises one minus the skin tone detection score, wherein the skin tone detection score is between zero and one, and wherein the skin tone detection score is proportional to a likelihood the individual pixel comprises a skin tone.

Further to the first embodiments, performing the skin tone based enhancement of the individual pixel comprises modifying the individual pixel by a skin tone based extracted detail and the skin tone based extracted detail comprises a product of a skin tone based enhancement factor, a gain factor, and the local detail information and the skin tone based enhancement factor comprises one plus the skin tone detection score, wherein the skin tone detection score is between zero and one, and wherein the skin tone detection score is proportional to a likelihood the individual pixel comprises a skin tone.

Further to the first embodiments, performing the skin tone based enhancement of the individual pixel comprises modifying the individual pixel by a skin tone based extracted detail and the skin tone based extracted detail comprises a product of a skin tone based enhancement factor, a gain factor, and the local detail information and the skin tone based enhancement factor comprises one minus the skin tone detection score and the skin tone based enhancement factor comprises one minus the skin tone detection score or wherein the skin tone based enhancement factor comprises one plus the skin tone detection score, wherein the skin tone detection score is between zero and one, and wherein the skin tone detection score is proportional to a likelihood the individual pixel comprises a skin tone.

Further to the first embodiments, performing the skin tone based enhancement of the individual pixel comprises modifying the individual pixel by a skin tone based extracted detail and the skin tone based extracted detail comprises a product of a skin tone based enhancement factor, a gain factor, and the local detail information and the skin tone based enhancement factor comprises one minus the skin tone detection score and the gain factor is determined based on a monotonic function applied to a vertical gradient dependent detail gain factor and a horizontal gradient dependent detail gain factor.

Further to the first embodiments, performing the skin tone based enhancement of the individual pixel comprises modifying the individual pixel by a skin tone based extracted detail and the skin tone based extracted detail comprises a product of a skin tone based enhancement factor, a gain factor, and the local detail information and the skin tone based enhancement factor comprises one minus the skin tone detection score and the gain factor is determined based on a monotonic function applied to a vertical gradient dependent detail gain factor and a horizontal gradient dependent detail gain factor and the vertical gradient dependent detail gain factor comprises a convolution of a Sobel kernel and the individual pixel.

Further to the first embodiments, performing the skin tone based enhancement of the individual pixel is based on a skin tone tuned image enhancement filter being enabled.

Further to the first embodiments, the individual pixel comprises a pixel in a YUV color space, and wherein determining the skin tone detection score comprises determining a first likelihood of the individual pixel being skin toned in a UV plane, a second likelihood of the individual pixel being skin toned in a VY plane, and a third likelihood of the individual pixel being skin toned over the Y axis, and determining the skin tone detection score as a minimum of the first, second and third likelihoods.

Further to the first embodiments, the individual pixel comprises a pixel in a YUV color space, and wherein determining the skin tone detection score comprises determining a first likelihood of the individual pixel being skin toned in a UV plane, a second likelihood of the individual pixel being skin toned in a VY plane, and a third likelihood of the individual pixel being skin toned over the Y axis, and determining the skin tone detection score as a minimum of the first, second and third likelihoods and determining the first likelihood comprises projecting a cluster in a 3D YUV domain, wherein a center of the cluster comprises a center of skin color, onto the UV plane to generate a UV projection, transforming the UV projection to a hue-saturation domain to generate a transformed projection, approximating a shape of the transformed projection based on an enclosure in the hue-saturation domain, and determining, when an approximation of the individual pixel in the hue-saturation domain is within the enclosure, the first likelihood based on a distance relationship between the approximation of the individual pixel and the center of the cluster in the hue-saturation domain, and/or determining the second likelihood comprises projecting the cluster in the 3D YUV domain onto the YV plane to generate a YV projection, enclosing the YV projection based on a first piece-wise linear function, and determining the second likelihood based on the individual pixel and the first piece-wise linear function, and/or determining the third likelihood comprises projecting the cluster onto the Y axis to generate a Y projection, enclosing the Y projection based on a second piece-wise linear function, and determining the third likelihood based on the individual pixel and the second piece-wise linear function.

Further to the first embodiments, the local detail information comprises a difference between a first local detail information for a first window around the individual pixel and a second local detail information for a second window around the individual pixel, wherein the first window is larger than the second window.

Further to the first embodiments, the local detail information comprises a difference between a first local detail information for a first window around the individual pixel and a second local detail information for a second window around the individual pixel, wherein the first window is larger than the second window and the first local detail information comprises a weighted gray-level difference between a first pixel in the first window and the individual pixel.

Further to the first embodiments, the method further comprises retrieving the input image from a memory, wherein the input image comprises at least one of a decoded image, a captured image, a rendered image, or an image from a sequence of video images, converting, prior to determining the skin tone detection score, the input image from a first color space to a second color space, wherein the second color space comprises a YUV color space and the first color space comprises an RGB color space, receiving a center of skin color via a driver, and storing the output image into the memory, wherein the output image is configured for at least one of presentment via a display device or encoding via an encoder, wherein performing the skin tone based enhancement of the individual pixel comprises modifying at least one of a luma value or a chroma value of the individual pixel.

In one or more second embodiments, a system for providing image enhancement on a computing device comprises a display device configured to present image data and a graphics processing unit coupled to the display device, wherein the graphics processing unit comprises fixed function circuitry including a skin tone detection module configured to determine a skin tone detection score for an individual pixel of an input image and an execution unit including a detail extractor module configured to determine a local detail information for the individual pixel and a skin tone aware detail enhancement module configured to perform a skin tone based enhancement of the individual pixel based on the skin tone detection score and the local detail information to generate an individual output pixel of an output image.

Further to the second embodiments, the skin tone aware detail enhancement module being configured to perform the skin tone based enhancement of the individual pixel comprises the execution unit being configured to modify the individual pixel by a skin tone based extracted detail.

Further to the second embodiments, the skin tone aware detail enhancement module being configured to perform the skin tone based enhancement of the individual pixel comprises the execution unit being configured to modify the individual pixel by a skin tone based extracted detail and the skin tone based extracted detail comprises a product of a skin tone based enhancement factor, a gain factor, and the local detail information.

Further to the second embodiments, the skin tone aware detail enhancement module being configured to perform the skin tone based enhancement of the individual pixel comprises the execution unit being configured to modify the individual pixel by a skin tone based extracted detail and the skin tone based extracted detail comprises a product of a skin tone based enhancement factor, a gain factor, and the local detail information and the skin tone aware detail enhancement module is configured to determine the gain factor based on a monotonic function applied to a vertical gradient dependent detail gain factor and a horizontal gradient dependent detail gain factor.

Further to the second embodiments, the skin tone detection score is based at least in part on a center of skin color received via a driver.

Further to the second embodiments, the local detail information comprises a difference between a first local detail information for a first window around the individual pixel and a second local detail information for a second window around the individual pixel, wherein the first window is a 5 by 5 window and the second window is a 3 by 3 window.

Further to the second embodiments, the system includes a memory configured to store at least one of the input image or the output image.

In one or more third embodiments, at least one machine readable medium comprises a plurality of instructions that in response to being executed on a computing device, cause the computing device to perform image enhancement by determining a skin tone detection score for an individual pixel of an input image, determining a local detail information for the individual pixel, and performing a skin tone based enhancement of the individual pixel based on the skin tone detection score and the local detail information to generate an individual output pixel of an output image.

Further to the third embodiments, the skin tone based enhancement of the individual pixel comprises modifying the individual pixel by a skin tone based extracted detail, and wherein the skin tone based extracted detail comprises a product of a skin tone based enhancement factor, a gain factor, and the local detail information.

Further to the third embodiments, the skin tone based enhancement factor comprises at least one of one minus the skin tone detection score or one plus the skin tone detection score, wherein the skin tone detection score is between zero and one, and wherein the skin tone detection score is proportional to a likelihood the individual pixel comprises a skin tone.

Further to the third embodiments, the skin tone based enhancement factor comprises at least one of one minus the skin tone detection score or one plus the skin tone detection score, wherein the skin tone detection score is between zero and one, and wherein the skin tone detection score is proportional to a likelihood the individual pixel comprises a skin tone and the gain factor is determined based on a monotonic function applied to a vertical gradient dependent detail gain factor and a horizontal gradient dependent detail gain factor.

Further to the third embodiments, the individual pixel comprises a pixel in a YUV color space, wherein determining the skin tone detection score comprises determining a first likelihood of the individual pixel being skin toned in a UV plane, a second likelihood of the individual pixel being skin toned in a VY plane, and a third likelihood of the individual pixel being skin toned over the Y axis, and determining the skin tone detection score as a minimum of the first, second and third likelihoods, and wherein the local detail information comprises a difference between a first local detail information for a first window around the individual pixel and a second local detail information for a second window around the individual pixel, wherein the first window is larger than the second window.

In one or more fourth embodiments, a system for providing image enhancement on a computing device comprises a display device configured to present image data and a graphics processing unit coupled to the display device, wherein the graphics processing unit comprises means for determining a skin tone detection score for an individual pixel of an input image, means for determining a local detail information for the individual pixel, and means for performing a skin tone based enhancement of the individual pixel based on the skin tone detection score and the local detail information to generate an individual output pixel of an output image.

Further to the fourth embodiments, performing the skin tone based enhancement of the individual pixel comprises modifying the individual pixel by a skin tone based extracted detail.

Further to the fourth embodiments, performing the skin tone based enhancement of the individual pixel comprises modifying the individual pixel by a skin tone based extracted detail and the skin tone based extracted detail comprises a product of a skin tone based enhancement factor, a gain factor, and the local detail information.

Further to the fourth embodiments, the individual pixel comprises a pixel in a YUV color space, and wherein determining the skin tone detection score comprises determining a first likelihood of the individual pixel being skin toned in a UV plane, a second likelihood of the individual pixel being skin toned in a VY plane, and a third likelihood of the individual pixel being skin toned over the Y axis, and determining the skin tone detection score as a minimum of the first, second and third likelihoods.

Further to the fourth embodiments, the local detail information comprises a difference between a first local detail information for a first window around the individual pixel and a second local detail information for a second window around the individual pixel, wherein the first window is larger than the second window.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed is:

1. A computer-implemented method for image enhancement, comprising:
   determining a skin tone detection score for an individual pixel of an input image;
   determining a local detail information for the individual pixel, wherein the local detail information comprises a difference between a first local detail information for a first window around the individual pixel and a second local detail information for a second window around the individual pixel, wherein the first window is larger than the second window; and
   performing a skin tone based enhancement of the individual pixel based on the skin tone detection score and the local detail information to generate an individual output pixel of an output image.

2. The method of claim 1, wherein performing the skin tone based enhancement of the individual pixel comprises modifying the individual pixel by a skin tone based extracted detail.

3. The method of claim 2, wherein the skin tone based extracted detail comprises a product of a skin tone based enhancement factor, a gain factor, and the local detail information.

4. The method of claim 3, wherein the skin tone based enhancement factor comprises one minus the skin tone detection score, wherein the skin tone detection score is between zero and one, and wherein the skin tone detection score is proportional to a likelihood the individual pixel comprises a skin tone.

5. The method of claim 3, wherein the skin tone based enhancement factor comprises one plus the skin tone detection score, wherein the skin tone detection score is between zero and one, and wherein the skin tone detection score is proportional to a likelihood the individual pixel comprises a skin tone.

6. The method of claim 3, wherein the gain factor is determined based on a monotonic function applied to a vertical gradient dependent detail gain factor and a horizontal gradient dependent detail gain factor.

7. The method of claim 6, wherein the vertical gradient dependent detail gain factor comprises a convolution of a Sobel kernel and the individual pixel.

8. The method of claim 1, wherein performing the skin tone based enhancement of the individual pixel is based on a skin tone tuned image enhancement filter being enabled.

9. The method of claim 1, wherein the individual pixel comprises a pixel in a YUV color space, and wherein determining the skin tone detection score comprises determining a first likelihood of the individual pixel being skin toned in a UV plane, a second likelihood of the individual pixel being skin toned in a VY plane, and a third likelihood of the individual pixel being skin toned over the Y axis, and determining the skin tone detection score as a minimum of the first, second and third likelihoods.

10. The method of claim 9, wherein determining the first likelihood comprises:
projecting a cluster in a 3D YUV domain, wherein a center of the cluster comprises a center of skin color, onto the UV plane to generate a UV projection;
transforming the UV projection to a hue-saturation domain to generate a transformed projection;
approximating a shape of the transformed projection based on an enclosure in the hue-saturation domain; and
determining, when an approximation of the individual pixel in the hue-saturation domain is within the enclosure, the first likelihood based on a distance relationship between the approximation of the individual pixel and the center of the cluster in the hue-saturation domain,
wherein determining the second likelihood comprises:
projecting the cluster in the 3D YUV domain onto the YV plane to generate a YV projection;
enclosing the YV projection based on a first piece-wise linear function; and
determining the second likelihood based on the individual pixel and the first piece-wise linear function, and
wherein determining the third likelihood comprises:
projecting the cluster onto the Y axis to generate a Y projection;
enclosing the Y projection based on a second piece-wise linear function; and
determining the third likelihood based on the individual pixel and the second piece-wise linear function.

11. The method of claim 1, wherein the first local detail information comprises a weighted gray-level difference between a first pixel in the first window and the individual pixel.

12. The method of claim 1, further comprising:
retrieving the input image from a memory, wherein the input image comprises at least one of a decoded image, a captured image, a rendered image, or an image from a sequence of video images;
converting, prior to determining the skin tone detection score, the input image from a first color space to a second color space, wherein the second color space comprises a YUV color space and the first color space comprises an RGB color space;
receiving a center of skin color via a driver; and
storing the output image into the memory, wherein the output image is configured for at least one of presentment via a display device or encoding via an encoder,
wherein performing the skin tone based enhancement of the individual pixel comprises modifying at least one of a luma value or a chroma value of the individual pixel.

13. A system for providing image enhancement on a computing device, comprising:
a display device configured to present image data; and
a processor coupled to the display device, the processor to determine a skin tone detection score for an individual pixel of an input image, to determine a local detail information for the individual pixel, wherein the local detail information comprises a difference between a first local detail information for a first window around the individual pixel and a second local detail information for a second window around the individual pixel, wherein the first window is larger than the second window, and to perform a skin tone based enhancement of the individual pixel based on the skin tone detection score and the local detail information to generate an individual output pixel of an output image.

14. The system of claim 13, wherein the processor to perform the skin tone based enhancement of the individual pixel comprises the processor to modify the individual pixel by a skin tone based extracted detail.

15. The system of claim 14, wherein the skin tone based extracted detail comprises a product of a skin tone based enhancement factor, a gain factor, and the local detail information.

16. The system of claim 15, wherein the processor is to determine the gain factor based on a monotonic function applied to a vertical gradient dependent detail gain factor and a horizontal gradient dependent detail gain factor.

17. The system of claim 13, wherein the skin tone detection score is based at least in part on a center of skin color received via a driver.

18. The system of claim 13, wherein the first window is a 5 by 5 window and the second window is a 3 by 3 window.

19. The system of claim 13, further comprising:
a memory configured to store at least one of the input image or the output image.

20. At least one non-transitory machine readable medium comprising a plurality of instructions that in response to being executed on a computing device, cause the computing device to perform image enhancement by:
determining a skin tone detection score for an individual pixel of an input image;
determining a local detail information for the individual pixel, wherein the local detail information comprises a difference between a first local detail information for a first window around the individual pixel and a second local detail information for a second window around the individual pixel, wherein the first window is larger than the second window; and performing a skin tone based enhancement of the individual pixel based on the skin tone detection score and the local detail information to generate an individual output pixel of an output image.

21. The machine readable medium of claim 20, wherein performing the skin tone based enhancement of the individual pixel comprises modifying the individual pixel by a skin tone based extracted detail, and wherein the skin tone based extracted detail comprises a product of a skin tone based enhancement factor, a gain factor, and the local detail information.

22. The machine readable medium of claim 21, wherein the skin tone based enhancement factor comprises at least one of one minus the skin tone detection score or one plus the skin tone detection score, wherein the skin tone detection score is between zero and one, and wherein the skin tone detection score is proportional to a likelihood the individual pixel comprises a skin tone.

23. The machine readable medium of claim 21, wherein the gain factor is determined based on a monotonic function applied to a vertical gradient dependent detail gain factor and a horizontal gradient dependent detail gain factor.

24. The machine readable medium of claim 20, wherein the individual pixel comprises a pixel in a YUV color space, wherein determining the skin tone detection score comprises determining a first likelihood of the individual pixel being skin toned in a UV plane, a second likelihood of the individual pixel being skin toned in a VY plane, and a third likelihood of the individual pixel being skin toned over the Y axis, and determining the skin tone detection score as a minimum of the first, second and third likelihoods.

* * * * *